United States Patent [19]
Willey

[11] Patent Number: 5,639,142
[45] Date of Patent: Jun. 17, 1997

[54] UNIVERSAL MOUNT FOR SUNROOF AIR DEFLECTOR

[76] Inventor: Barry A. Willey, 727 Ela Rd., Inverness, Ill. 60067

[21] Appl. No.: 549,386

[22] Filed: Oct. 27, 1995

[51] Int. Cl.⁶ .................................................. B60J 7/043
[52] U.S. Cl. .................................................. 296/217
[58] Field of Search ................................. 296/217, 91

[56] References Cited

U.S. PATENT DOCUMENTS

| | | | |
|---|---|---|---|
| 4,171,846 | 10/1979 | Isleif et al. | 296/217 |
| 4,480,869 | 11/1984 | Splithoff | 296/217 |
| 4,705,316 | 11/1987 | Jardin et al. | 296/217 |

FOREIGN PATENT DOCUMENTS

| | | | |
|---|---|---|---|
| 3132774 | 3/1983 | Germany | 296/217 |
| 3400992 | 7/1985 | Germany | 296/217 |
| 3432908 | 3/1986 | Germany | 296/217 |
| 82820 | 4/1988 | Japan | 296/217 |

*Primary Examiner*—Joseph D. Pape
*Attorney, Agent, or Firm*—James T. Fitzgibbon

[57] ABSTRACT

A sunroof air deflector and adjustable hold-down and latching system. The main body portion of the deflector includes a pair of opposed pockets each including bottom and side wall portions. The bottom wall includes portions defining an elongated transverse slot, a fastener received in the slot and a hold-down hook having an upper portion adjustably secured to the fastener. The pockets include removable covers having cover retainers received in the pocket walls, and the outer margins of the covers overlie the pocket-forming areas. In one form, the retainers are received in slots extending outwardly as narrower continuations of the fastener receiving slots.

12 Claims, 2 Drawing Sheets

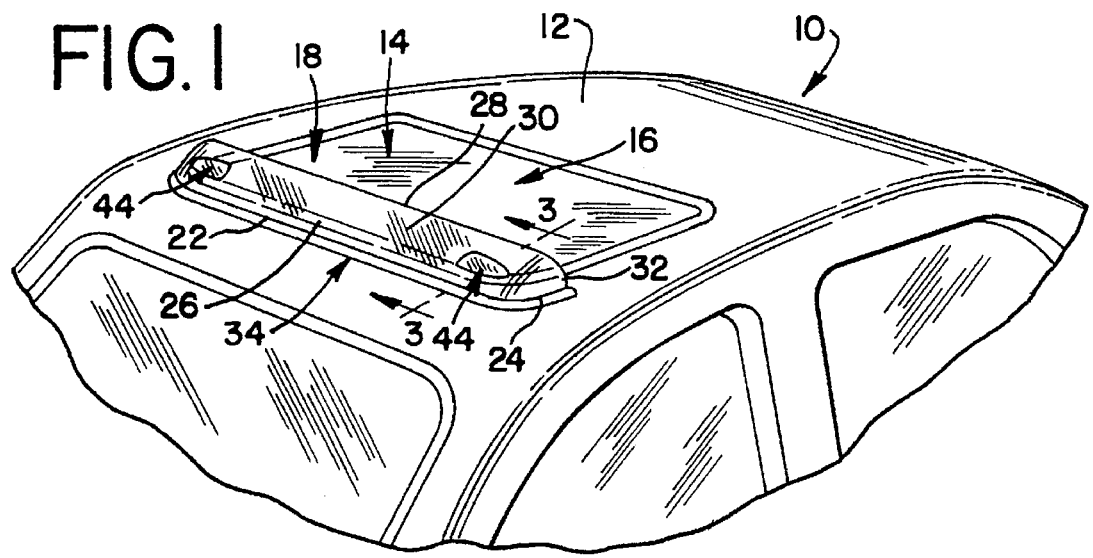
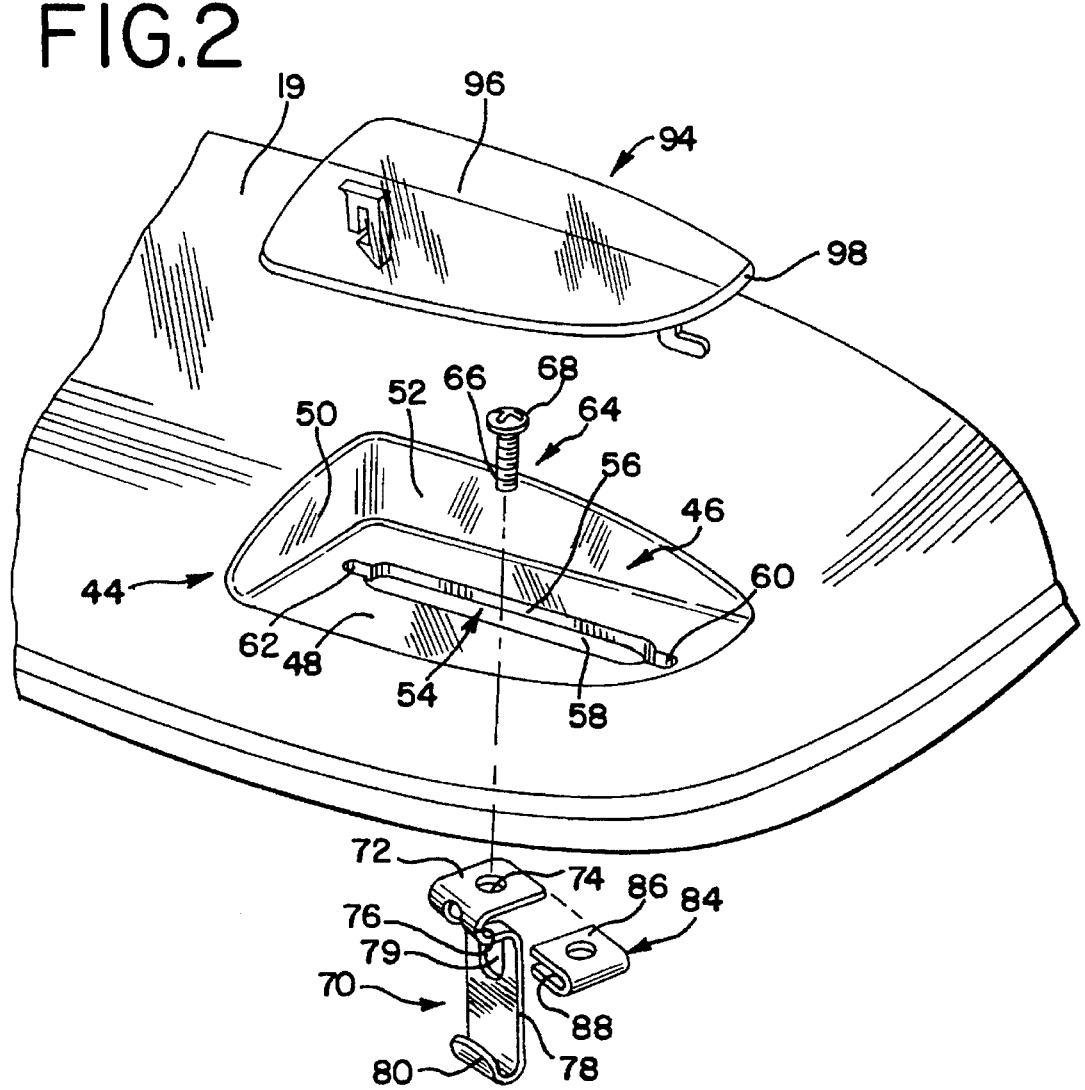

UNIVERSAL MOUNT FOR SUNROOF AIR DEFLECTOR

BACKGROUND OF THE INVENTION

The present invention relates generally to automotive accessories and more particularly to attachments for vehicle sunroofs. In recent years, there has been a continuing demand for sunroofs in automotive vehicles, with automobiles of all sorts and even trucks being equipped with sunroofs.

The perceived advantage of sunroofs include the ability to provide an open top vehicle without sacrifice of structural rigidity, the general open air feeling which results from such a construction and in particular, the ability of the vehicle, when the sunroof is closed, to provide a relatively weather-tight, low noise environment equal to that provided in the absence of the sunroof. In this connection, all or almost all of the sunroofs of modern vehicles are of the rigid or all metal exterior type sunroofs, even though sunroofs with flexible components are also known to the industry.

One of the disadvantages of a sunroof, however, is that wind turbulence in the vicinity of the leading edge of the opening, and the general geometry of the opening, which must be congruent with the shape of the vehicle roof, inherently creates some problems of noise and turbulence. Accordingly, in recent years, a number of vehicles with sunroofs have added, as an accessory to the vehicle, what is termed a sunroof air deflector. This unit acts much in the manner of the vehicle windshield in a conventional automobile or motorcycle, and generally resembles such a windshield except that its proportions and shapes are somewhat different.

The typical sunroof air deflector has a support edge portion which usually extends transversely of the major part of the vehicle roof and terminates in laterally outside or wing portions that are swept out and back, extending roughly parallel to the sides of the automobile. The trailing edge of the deflector is a free edge that includes a center portion which extends transversely to the movement axis of the vehicle and is generally horizontal in the normal position of the vehicle, with the trailing edge also having downturned end portions that meet the wings of the support edges adjacent their outer ends.

Customarily, such sunroof air deflectors are made from a plastic material which is stiff but resilient, such as from an acrylic or other thermoplastic material. Sunroof air deflectors may be made from other materials, including different plastics, metal, or the like, although the acrylic plastics are presently preferred for a number of reasons.

The manner of securing a sunroof air deflector to a vehicle roof has also been the subject of research and development. Because of the loading created by rapid vehicle movement, the deflector should be secured tightly to the vehicle roof. However, permanent installation steps such as bolting or screwing the deflector through the vehicle roof have obvious disadvantages. Customarily, a mounting unit in the form of a grooved rubber or rubber like gasket is positioned between the vehicle body and the deflector, with the groove in the gasket being glued or otherwise tightly secured to the leading edge margin of the above-described deflector. In some prior art applications, the downwardly directed surface of the gasket contacts and is secured to the vehicle roof by a pressure sensitive adhesive that either forms a part of the gasket or is installed as a separate component between the gasket and the deflector.

Problems arise with such adhesive mountings, however. Thus, assuming that the adhesives are sufficiently strong to ensure that there will be no undesired separation of the deflector from the vehicle roof, a risk of damage to the finish of the car is created. Naturally, attempts to repeatedly remove the deflector shield for washing or maintenance compromises the effectiveness of the adhesive or requires new adhesive to be used. In addition, the forces needed to hold down all portions of a deflector shield with complex contour in its contact surface are sometimes quite high. Proper load distribution is sometimes difficult to achieve. Accordingly, attempts to utilize gasket adhesion as a method of retaining the deflector in place have not afforded all the advantages desired for a desirable deflector.

In view of these circumstances, and the general configuration of the deflector, various other fastening means have been considered. However, the structures of such prior auxiliary hold-down or clamping devices have not always been satisfactory. A particular difficulty with sunroof deflectors that are sold into the so-called automotive aftermarket is the wide variety of styles of sunroofs as well as the great variety in the size and types of vehicle in which the sunroofs are installed. Thus, some sunroofs are factory installed on a number of different car models. Still other sunroofs are dealer-installed, and another significant sources of sunroof installation are those of specialists or other contractors who cut the openings and do the metal forming and other operations required to install the sunroof. In each of these different situations, the style, size and shape of the opening may be different, even for the same vehicle make, model and year of manufacture.

Thus, in view of the wide variety of vehicles that include sunroofs, and the variety in the size of openings in such vehicles, the problem of providing a hold-down that is sized appropriately can create serious problems for the sunroof retailer or other supplier. If a different model or size of deflector unit is required for each application, bearing in mind the great range of widths in automobiles and the variety and widths of sunroof openings relative to the overall width of the vehicle roof, and the number and kind of sunroof installations, the number of different sizes or styles of deflector that would be needed to be reasonably sure of providing a proper fit for many popular vehicles would be prohibitively large.

Accordingly, it is an object of the invention to provide a sunroof air deflector, which, within limits, is capable of universal application.

It is another object of this invention is to provide a sunroof arrangement wherein a pair of pockets or the like with removable covers are disposed within a deflector for inconspicuously accommodating an adjustable hold-down fastener or the like.

Yet another object of the invention is to provide a hold-down arrangement for a sunroof air deflector wherein a single slot having a wide center portion and a reduced width portion on each end may be adapted for providing a universal type sunroof air deflector that would appear to have a custom appearance when viewed from outside.

A further object of the invention is to provide a sunroof air deflector when the adjustment mechanism is essentially concealed from view.

Another object of the invention is to provide a sunroof air deflector that can be mounted securely without adhesives, clips, or requiring drilling operations for its installation.

Yet another object of the invention is to provide a sunroof air deflector wherein the hold-down mechanism includes important parts that are integrally formed as a portion of the shield, or which may be formed separately and inserted into the shield in a separate operation.

A further objection of the invention is to provide a sunroof air deflector which is made from material which is thin enough to be formed into complex shapes in order to provide a pair of fastener receiving pockets and yet is contoured so as to be stiff enough to resist deflection and instability in use.

A still further object of the invention is to provide a simple, low cost hold-down system for a vehicle sunroof wherein a portion of the fastening system includes a resilient metal portion adapted to compensate for diminished downforce resulting from cold flow or creep in the plastic body of the sunroof deflector.

An additional object of the invention is to provide a sunroof air deflector hold-down system which is adapted to register with and be effective with a variety of widths, whereby three to five different model numbers will accommodate virtually the entire spectrum of vehicles having sunroofs, regardless of size or age.

Another object of the invention is to provide an inconspicuous, universal type hold-down system that presents a quality image.

Yet another object of the invention is to provide a deflector shield hold-down of a type which will create little if any wind noise and which is comparatively weatherproof in use.

The foregoing and other objects and advantages of the invention are achieved in practice by providing a sunroof air deflector having a mounting edge portion comprising a leading edge and a pair of backswept side edges, and a trailing edge having a central portion extending transversely of the vehicle movement axis and having end portions meeting the side edge portions of the deflector, with the unit further including a pair of opposed pockets, each having an elongated slot for a fastener, a hook and spring arrangement positionable and adjustable by a suitable fastener, and a snap-in type pocket cover having its upper surface adapted in use to lie substantially flush with the upper, outer surface of the deflector unit.

The manner in which the foregoing and other objects and advantages of the invention are achieved in practice will become more clearly apparent when reference is made to the following detailed description of the preferred embodiments of the invention set forth by way of example and shown in the accompanying drawings, in which like reference numbers indicate corresponding parts throughout.

BRIEF DESCRIPTION OF THE DRAWINGS

FIG. 1 is a perspective view of a vehicle exterior showing a novel sunroof air deflector in position of use adjacent the opening for a sunroof;

FIG. 2 is a greatly enlarged, exploded perspective view showing the hold-down mechanism, one form of fastener-receiving pocket in the deflector shield and one form of a snap-in type pocket cover made according to the invention;

DESCRIPTION OF THE PREFERRED EMBODIMENTS OF THE INVENTION

Figure 3:
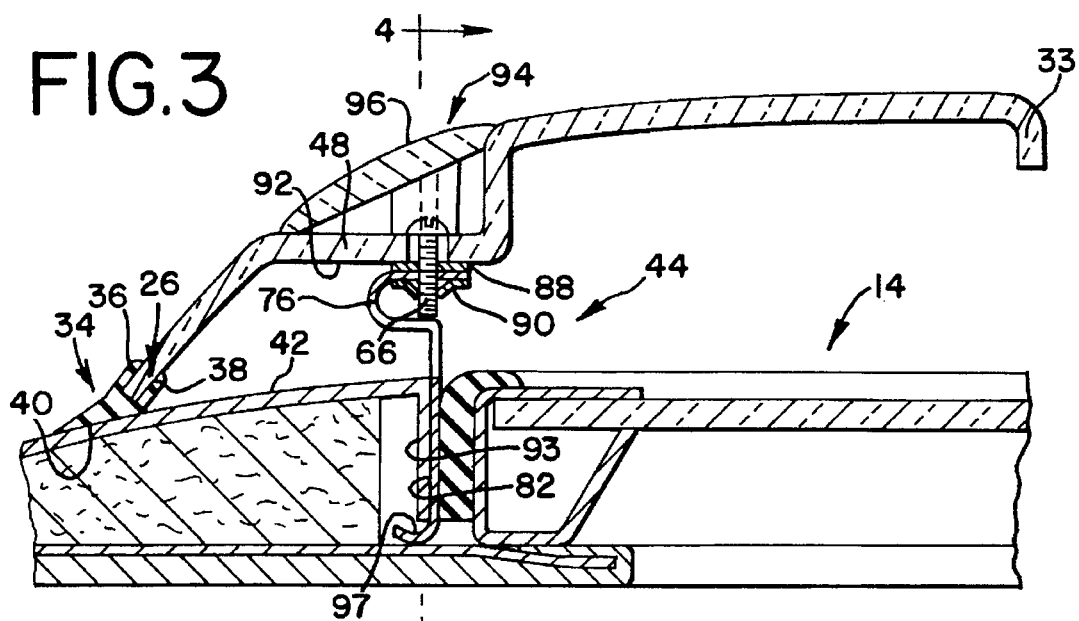
FIG. 3 is a vertical sectional view, in a further enlarged scale, showing the hold-down arrangement of FIGS. 1 and 2.

While it will be understood that the principles of the invention may be applied to different forms of apparatus and that deflectors incorporating the inventive principles may vary in constructional details, a description will be given of a presently preferred form of apparatus embodying the present invention.

Referring now to FIG. 1, there is shown a vehicle generally designated 10 having a roof portion 12 in which an opening generally designated 14 is provided to accommodate a retractable sunroof generally designated 16. A sunroof air deflector generally designated 18 and shown to be made according to the invention is shown positioned atop the vehicle roof 12.

The deflector unit generally designated 18 is shown to have a body 19 with a leading edge portion 20 which lies generally parallel to the windshield and perpendicular to the movement axis of the vehicle, with the leading edge 20 including a principal portion 22, and a pair of identical, sweptback wing portions 24. The trailing edge portion 28 is a free edge defining the remainder of the body 19 and this edge 28 includes a principal, generally transverse margin 30, and a pair of outer free margins 32 extending outwardly and downwardly to join the end portions of the wings 24. A downturned stiffening lip 33 is integrally formed on a portion of the trailing edge 28.

Figure 4A:
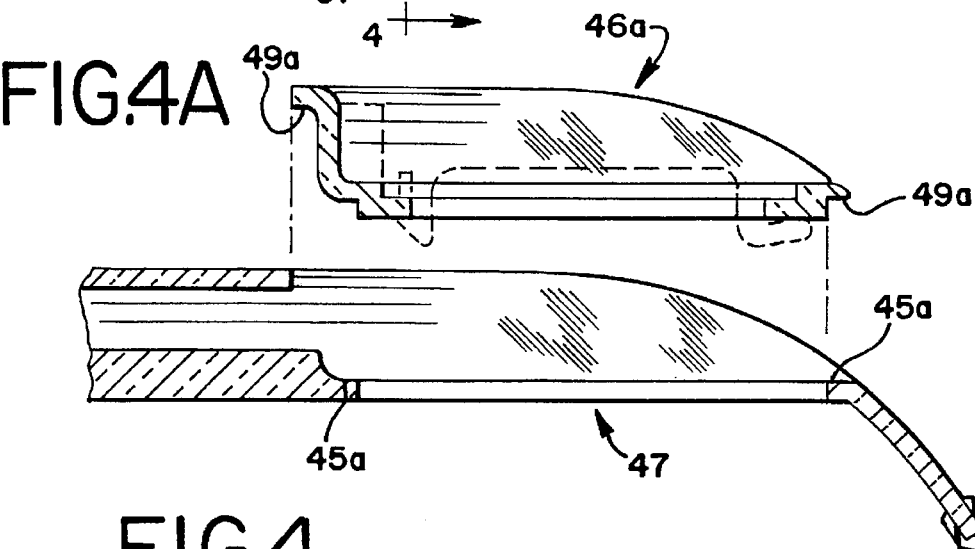
FIG. 4 is a vertical, sectional view, taken along lines 4—4 of FIG. 3 and showing the sunroof air deflector hold-down arrangement including the means for adjusting the positioning of the hold-down hook and showing the construction of an arrangement of one form of snap-in pocket cover of the invention; and, FIG. 4A is a view similar to that of FIG. 4, but showing a construction with a separately formed pocket area.
Figure 4:
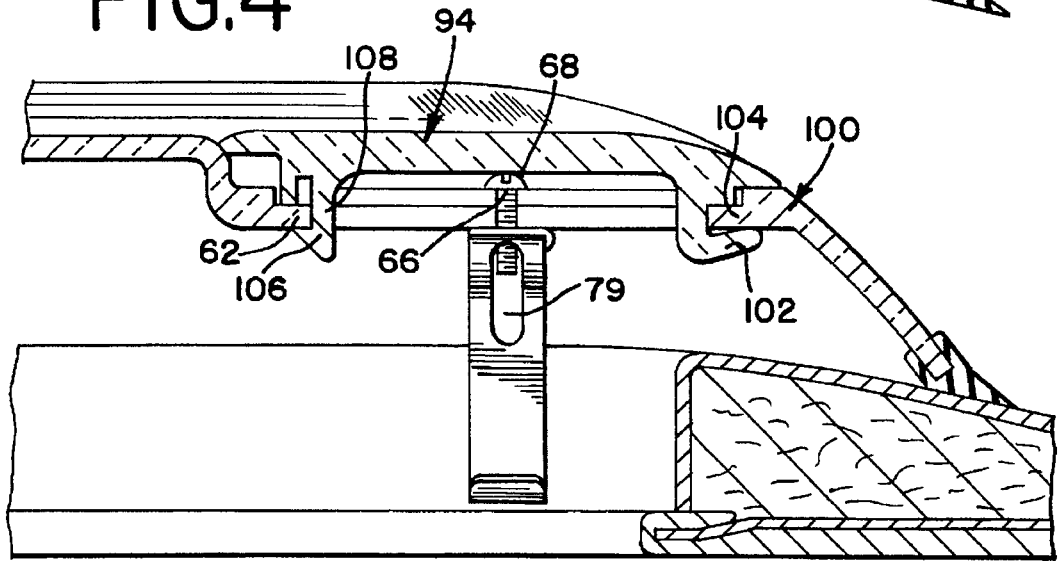

The body 19 of the deflector 18 is secured to a mounting gasket generally designated 34 and shown in FIGS. 3 and 4 to include a pair of spaced apart flaps 36, 38, defining therebetween a groove generally designated 26 to accommodate the leading edge portion 20 of the deflector 18. A downwardly facing contact surface 40 of the gasket 34 is held in contact throughout its length by the downforce created by the hold-down system of the invention.

According to the invention, a pair of substantially identical, mirror image auxiliary hold-down arrangements generally designated 44 are provided. A typical unit 44 is shown in FIG. 2 to include a contoured pocket portion generally designated 46 lying in a corner that is adjacent an outer margin of the deflector body 19, with the pocket 46 being defined by a generally horizontal bottom surface 48 and a pair of contoured, somewhat rounded, but generally vertically extending side and rear surfaces 50, 52. The bottom surface 48 includes an elongated fastener-receiving slot generally designated 54 and shown to be formed by parallel, spaced apart edges 56 of the pocket bottom surface 48. These edges 56 are more closely spaced apart adjacent the inner and outer ends of the slot 58, and here, these edges serve to define reduced width slot extensions 60, 62.

Further in accordance with the invention, a fastener in the form of a screw generally designated 64 having a threaded shank 66 and an enlarged head portion 68 is positionable so as to be freely movable from left to right within the fastener-receiving slot 58. A load applying hook unit 70 is associated in use with the fastener 64. The hook 70 includes several features and includes an upper, mounting flange portion 72 with an opening 74 therein for receiving the threaded shank 66 of the fastener. The hook 70 also includes a bight portion 76, an elongated shank 78 and a barb 80 at its lower end for engaging a downwardly extending hem or curl 82 (FIG. 3) defining the leading edge of the sunroof opening 14. In one version, a spring steel captive nut arrangement generally designated 84 and having upper and lower, thread-engaging flanges 88, 90, is positionable with its center opening registrable with the fastener opening 74 in the flange 72 of the hook 70.

The shank 78 of the hook 70 is elongated and includes a slot 79 best shown in FIGS. 2 and 4, with the slot being substantially vertically aligned with the center line axis of the fastener 74 and arranged to permit the bottom end of the fastener to reach the bottom of the slot when the screw is fully tightened. Normally, the slot 79, although elongated, is of substantially less length than the entire shank 78, inasmuch as a tighter weather seal is able to be provided between the sunroof in the closed position and a solid shank rather than a slotted shank.

The flange 72 of the hook 70 is shown as not being threaded with this function being performed by the captive nut 84; however, in another preferred form, the flange 72 includes a pair of stamped-in, opposed ears serving as deformable threads for cooperation with the fastener 64.

An important feature of the invention is the provision of the bight portion 76 of the hook, which, in effect, provides a high rate spring with a substantial memory. Advantages of this feature are discussed elsewhere herein.

As shown in FIGS. 3 and 4, the shank 66 of the fastener is comparatively elongated so as to permit adjustment of the tension on the hook. Moreover, when the deflector is sold as a kit, two or more extra hooks of different lengths may be provided for different vehicles or sunroof styles to accommodate variations in the depth of the seam defining the sunroof opening.

FIG. 3 shows the hook 70 with its upper flange 72 near the bottom surface 92 of the pocket bottom wall 48. However, in use, there is often a space or gap in this area because the hook may be fully tensioned without utilizing all the travel afforded by the fastener shank 66. Screws of different lengths can also be provided when the deflector is sold in kit form.

Referring now to FIGS. 2–4, there is shown a contoured pocket cover generally designated 94 and shown to include a contoured outer surface 96 which is approximately of the shape and size of the pocket 46 when the pocket is viewed in plan. Outer, preferably tapered edges 98 define the outline of the cover 96 which engages the margins of the surfaces defining the pocket 46 in use. In one preferred form, the cover 94 is secured by a pair of oppositely directed, integrally formed fasteners including an outer fastener 100 having a leg 102 spaced somewhat apart from its main body portion to provide a slot 104 for receiving a portion of the pocket wall 48 in the reduced width area 60 of the slot.

The opposite side of the pocket cover 94 includes a similar arrangement except that a barbed, snap-out hook 106 is provided with a deflectable shank 108. An inner portion of the slot extension 62 accommodates this snap-out hook 106, the width of which is sufficient to provide strength but narrow enough to fit within the slot extensions 60, 62.

It will be understood that the hold-down arrangement of the invention includes substantially identical, mirror image portions, one for the left-hand side and one for the right-hand side of the deflector shield. Accordingly, both units being substantially identical, only one has been described in detail.

When it is desired to install the sunroof deflector of the invention, the shield assembly 18 is centered with respect to the vehicle, and the trailing edge is positioned in overlapping relation to the leading edge of the sunroof opening. This permits the elongated slots 54 in the pocket 46 to be aligned with the opening leading edge. The fastener 64 is then manipulated within the slot 54 until an appropriate section of the hem defining the sunroof opening 14 is registered with the hook 70. Thereupon, the barb 80 of the hook 70 is pushed under the lower edge of the hem portion 91 defining the leading edge or corner of the sunroof opening 14. At this point, the lowermost or lower bight portion 93 of the hook is directly beneath the edge of the hem 91.

Then, with the hook so positioned, the fastener head 68 is engaged, as by a screwdriver or the like, and the screw is tightened. Initially, this pulls the leading edges, including the side or wing portions of the shield downwardly and into contact with the upper surface of the vehicle roof, creating a seal between the gasket face 40 and the outer surface of the roof 12. Subsequent tightening places the upper bight 76 of the hook 70 in tension, with the bight acting as a spring with excellent memory. Subsequent stress relaxation of the deflector body, or "creep" or "cold flow" occurring over time, (and especially with exposure of the deflector to temperature cycling,) will therefore not allow the deflector to loosen unexpectedly. Occasional tightening may be desirable, but the spring action of the bight accommodates initial compression set of the deflector body. As soon as the tightening operation is completed, which serves to place the body 19 of the deflector in compression and the hook and fastener in tension, the installation is complete.

The pocket cover 94 is then inserted in the pocket and assumes its position of use. This is accomplished, as shown for example in FIG. 2, by moving the right-hand cover slightly to the left of an aligned position, placing the leg 102 under an undersurface portion of the deflector body and rotating the opposite or inner end down until the hook portion 106 passes through the slot extension 62 and snaps into a locked position of use.

If, as is preferred, the sunroof air deflector is a relatively darkly tinted or opaque shield, and the pocket cover is made from the same or similar material, the adjusting mechanism becomes substantially invisible and the contours of the pocket cover assist smooth air flow and reduce turbulence and noise. When it is desired to adjust, reposition or remove the hold-down, the opposite steps are repeated, with the pocket cover being readily removable by biasing the hook 106 inwardly with the fingers from beneath the deflector body and rotating and lifting the pocket cover out of the way for access to the fasteners, which are manipulated in a reverse sense to that described for installation.

According to the invention, an extremely wide variety of vehicles has been able to be accommodated by the use of the invention. Thus, with the full width slot 54 being some 2½ inches wide and the slot extension 60, 62 being perhaps a ¼ inch wide each, the total variation between the widest and the narrowest settings of the retainer hooks may be as much as 5 inches. With this concept, three to five part numbers are able to be used on vehicles wherein the difference in hold-down positioning sites are 15 to 20 inches apart. Such adjustability has not been able to be achieved with prior art devices, particularly in combination with the other advantageous features of the invention.

Referring now in particular to FIGS. 2 and 3, it will be noted that, in the presently preferred form of apparatus, a pocket generally designated 46 is integrally formed in either end of the shield body. Utilizing a starting material which is sufficiently thin to permit forming of the comparatively complex contours of the pocket without creating undue stress concentrations has raised the possibility of compromising the overall stiffness of the shield body. Accordingly, in one presently preferred form, a downturned lip 33 as described above has been formed along the entire trailing edge, including the downturned portions where the trailing free edge meets the ends of the wing portions. This lip 33 creates significant additional stiffness in downward bending, i.e., along a locus generally parallel to and spaced forwardly from the downward extent of the lip. The starting material for a commercially satisfactory deflector shield is an acrylic material having a nominal starting thickness of about 3 mm (0.118"). Use of material of 4 to 5 mm in thickness is possible, but such material is difficult to form within a reasonable time in contours of the desired type. Accordingly, an integrally formed pocket, in combination with a downturned stiffening lip, is a desirable combination, according to the present invention.

Although a formed-in-place pocket is presently preferred, it is also possible, as illustrated in FIG. 4A, to separately form a pocket unit generally designated 46a, having a thin marginal flange 49a of a desirable shape in plan, and, after forming such a pocket that is otherwise similar to the pocket 46, dropping it into and sealing it within an opening generally designated 47 in a portion of the deflector shield.

In such a case, the opening 47 is defined by a lip 45a of reduced thickness. The lip portions 45a, 49a, are shown as being in opposed facing relationship. Upon insertion, the removable pocket assembly 46 may be held in place by suitable adhesives, by ultrasonic welding, or otherwise. This enables a relatively complex contour to be formed without the necessity of thermally or otherwise reworking or molding the deflector shield as a whole. In such an instance, the pocket may be formed by injection molding or otherwise from the same or similar material. If the basic shield material is of thicker cross-section, then it may be desired to eliminate the stiffening lip shown in the embodiment of FIGS. 1–4.

In the embodiment of FIG. 4A, similarly, the same style of cover as that shown in FIGS. 2–4 may be used, or a cover having different attachment points or a different attachment means may be provided. For example, the cover may be formed with a "living hinge" section attaching it to a separately formed pocket. Other snap-in arrangements similar to that shown in FIGS. 2–4 may be provided for separate covers, including arrangements wherein the hold-down mechanism is not a slot extension as in the preferred embodiment of FIG. 2, for example. Other variations will occur to those skilled in the art.

A preferred embodiment of the invention, having been described in detail, it is anticipated that modifications and variations to the described form of apparatus will occur to those skilled in the art and it is anticipated that such alterations and changes may be made without departing from the spirit of the invention of the appended claims.

I claim:

1. In combination, a sunroof air deflector and an adjustable hold-down and latching system, said deflector including a shield body portion, a leading edge portion and a free trailing edge portion, said leading edge portion including a principal portion and a pair of spaced apart wing portions all adapted to be positioned closely adjacent a vehicle roof, said free trailing edge portion having a principal portion disposed generally horizontally and a pair of portions extending generally vertically toward and joining the ends of said wing portions, a pair of widely spaced apart areas lying adjacent the outer portions of said shield body, each of said areas including a pocket formed in part by a bottom wall portion and side walls joined to the remainder of said shield body, each pocket bottom wall having spaced apart portions defining an elongated transverse slot of a given width, a fastener disposed in each slot, a hold-down hook element adjustably secured to said fastener, a pair of pocket covers each having a main body portion overlying said pocket-forming areas and outer margins overlying the portions of said shield body adjacent the margins of said pocket-forming areas, each of said covers further including cover retainers extending downwardly from the plane of said covers and being removably receivable within openings in said pocket-forming walls.

2. A combination as defined in claim 1 wherein said pockets are integrally formed as a part of said shield body.

3. A combination as defined in claim 1 wherein said pockets comprise separate components from said shield body and are secured in use within openings within said shield body.

4. A combination as defined in claim 1 wherein said shield body further includes a stiffening lip forming part of said free trailing edge of said shield body.

5. In combination, a sunroof air deflector and an adjustable hold-down and latching system, said deflector including a shield body portion, a leading edge portion and a free trailing edge portion, said leading edge portion including a principal portion and a pair of spaced apart wing portions all adapted to be positioned closely adjacent a vehicle roof, said free trailing edge portion having a principal portion disposed generally horizontally and a pair of generally vertically extending portions extending toward and joining the ends of said wing portions, a pair of widely spaced apart areas lying adjacent the outer portions of said shield body, each of said areas including a pocket formed in part by a bottom wall portion and side walls joined to the remainder of said shield body, each pocket bottom wall having spaced apart portions defining a continuous transverse slot with an elongated center portion of a given width and a pair of slot extensions, each of reduced width relative to said center portion, a fastener disposed in each slot, a hook element adjustably secured to said fastener, a pair of pocket covers each having a main body portion overlying said pocket-forming areas and each having a pair of cover retainers receivable respectively in said slot extensions, said fastener having a shank portion wider than said slot extensions and narrower than said elongated center portion of said slot.

6. A combination as defined in claim 5 wherein one of said pair of cover retainers includes a retainer leg portion spaced from said cover body by a retainer slot, said retainer leg engaging a portion of said bottom pocket wall lying just beyond the end of said slot extension.

7. A combination as defined in claim 5 wherein said other of said pair of cover retainers includes a resilient clip having a portion engaging said deflector adjacent an outer end of said slot extension to prevent unintentional removal of said clip and said pocket cover.

8. In combination, a sunroof air deflector and an adjustable hold-down and latching system, said deflector including a shield body portion, a leading edge portion and a free trailing edge portion, said leading edge portion including a principal portion and a pair of spaced apart wing portions all adapted to be positioned closely adjacent a vehicle roof, said free trailing edge portion having a principal portion disposed generally horizontally and a pair of portions extending generally vertically toward and joining the ends of said wing portions, a pair of widely spaced apart areas lying adjacent the outer portions of said shield body, each of said areas including a pocket formed in part by a bottom wall portion and side walls joined to the remainder of said shield body, each pocket bottom wall having spaced apart portions defining an elongated transverse slot of a given width, a slot extension having a width less than said given width, a fastener disposed in each slot, a hold-down hook element adjustably secured to said fastener, a pair of pocket covers each having a main body portion overlying said pocket-forming areas and outer margins overlying the portions of said shield body adjacent the margins of said pocket-forming areas, each of said covers further including cover retainers having portions removably received in use within said slot extensions.

9. In combination, a sunroof air deflector and an adjustable hold-down and latching system, said deflector including a shield body portion, a leading edge portion and a free trailing edge portion, said leading edge portion including a principal portion and a pair of spaced apart wing portions all adapted to be positioned closely adjacent a vehicle roof, said free trailing edge portion having a principal portion disposed generally horizontally and a pair of portions extending generally vertically toward and joining the ends of said wing portions, a pair of widely spaced apart areas lying adjacent the outer portions of said shield body, each of said areas including a pocket formed in part by a bottom wall portion and side walls joined to the remainder of said shield body; each pocket bottom wall having spaced apart portions defining an elongated transverse slot of a given width, a fastener disposed in each slot, a hold-down hook element adjustably secured to said fastener, a pair of pocket covers each having a main body portion overlying said pocket-forming areas and outer margins overlying the portions of said shield body adjacent the margins of said pocket-forming areas, each of said covers further including cover retainers removably receivable within openings in said pocket-forming walls, said hold-down hook elements each including an upper bight portion providing a flexible spring connection between a portion of said hook secured to said fastener and another, hem-engaging portion of said hook.

10. A combination as defined in claim 9 wherein said fastener has its shank portion generally vertically aligned with a shank portion of said hold-down hook.

11. A combination as defined in claim 8 wherein one of said pair of cover retainers includes a retainer leg portion spaced from the body of said cover by a retainer slot, said retainer leg engaging a portion of said bottom pocket wall lying just beyond the end of said slot extension.

12. A combination as defined in claim 8 wherein said other of said pair of cover retainers includes a resilient clip having a portion engaging a part of said deflector shield body adjacent an outer end of said slot extension to prevent unintentional removal of said clip and said cover.

* * * * *